(12) United States Patent
Imai et al.

(10) Patent No.: US 7,024,944 B2
(45) Date of Patent: Apr. 11, 2006

(54) ULTRASONIC FLOW METER

(75) Inventors: Hiroshi Imai, Gyoda (JP); Akira Takada, Gyoda (JP); Masahiro Hasunuma, Gyoda (JP)

(73) Assignee: Surpass Industry Co., Ltd., Saitama-Ken (JP)

( * ) Notice: Subject to any disclaimer, the term of this patent is extended or adjusted under 35 U.S.C. 154(b) by 117 days.

(21) Appl. No.: 10/870,317

(22) Filed: Jun. 16, 2004

(65) Prior Publication Data

US 2005/0011280 A1   Jan. 20, 2005

(30) Foreign Application Priority Data

Jun. 20, 2003   (JP) .................................... 2003-176421

(51) Int. Cl.
*G01F 1/66* (2006.01)

(52) U.S. Cl. .................................................. 73/861.27
(58) Field of Classification Search ............. 73/861.28, 73/861.27
See application file for complete search history.

(56) References Cited

U.S. PATENT DOCUMENTS 4,787,240 A    11/1988   McShane
6,490,933 B1   12/2002   Koyano et al.

FOREIGN PATENT DOCUMENTS

JP    61-132823   6/1986

*Primary Examiner*—Edward Lefkowitz
*Assistant Examiner*—Jewel V. Thompson
(74) *Attorney, Agent, or Firm*—Thelen Reid & Priest, LLP

(57) ABSTRACT

The present invention proposes an ultrasonic flow meter, comprising a conduit for measurement in which a liquid flows therein, and a pair of measurement sections which are provided in said conduit for measurement and are spaced apart by a certain interval along its longitudinal direction, and which obtains the flow velocity of said flowing liquid from the difference in the propagation time periods of ultrasonic in the two opposite directions between these measurement sections, and thereby measures the flow rate thereof; wherein a pair of fixing portions are provided which respectively support said conduit for measurement at the exterior side and also at the interior side in the longitudinal direction of said measurement sections.

16 Claims, 4 Drawing Sheets

ULTRASONIC FLOW METER

BACKGROUND OF THE INVENTION

1. Field of the Invention

The present invention relates to an ultrasonic flow meter which measures the flow rate of a liquid which is flowing in a conduit or the like by using ultrasonic waves.

Priority is claimed on Japanese Patent Application No. 2003-176421, filed Jun. 20, 2003, the content of which is incorporated herein by reference.

2. Description of the Related Art

As a flow meter which measures the flow rate of a liquid which is flowing through a conduit, there is a per se known type of ultrasonic flow meter which utilizes ultrasonics.

In this ultrasonic flow meter, there is provided, in a conduit for measurement of the flow of the flowing liquid, a measurement section which comprises transducers spaced apart by an interval in the longitudinal direction. An ultrasonic pulse which is generated from a first one of these transducers is received by another of these transducers, and further an ultrasonic pulse which is generated from that other one of these transducers is received by the first one thereof, so that the speed of the flow of the liquid within the conduit for measurement may be obtained from the difference of the transmission times for these ultrasonic pulses; and the flow rate is measured from this flow velocity.

As a conventional ultrasonic flow meter, for example, there is a per se known prior art (refer to Japanese Patent Application, First Publication No. Sho 61-132823) in which two ring shaped transducers are fitted in the flow conduit at a suitable interval so that each of their central axes matches the central axis of the flow conduit, with their central open portions being of almost the same size as the diameter of the flow conduit, and moreover with each of these ring shaped portions having a width equal to or greater than the thickness of the flow conduit. In this type of transducer, when an electrical signal of a predetermined frequency is applied to one of these ring shaped transducers, the transducer oscilates in its radial direction, so that, an ultrasonic signal is symmetrically emitted along the direction of the central axis of this transducer, which is the direction of the flow conduit. This ultrasonic signal passes through the central open portion of the other ring shaped element and oscilates it, and then an electrical signal which corresponds to the ultrasonic signal is outputted.

With such a prior art type of ultrasonic flow meter, when the conduit for measurement in to which both ends of the measurement section are fixed is oscilated due to reception of some unintentional external force such as noise or the like, then, when the oscilations are emitted from the transducer for measuring the flow rate of the flowing liquid, these oscilations become mixed with the oscilations of the conduit for measurement which the measurement device has received from externally, and therefore, the problem arises that it may become impossible to measure the flow rate of the flowing liquid accurately with the transducers, due to the ultrasonic signal which is being inputted from the transducer as a measurement oscilation becoming superimposed with these oscilations from externally. This fact becomes a particularly severe problem when the conduit for measurement is made from a synthetic resin material, since such a conduit for measurement is not a rigid body.

The present invention has been conceived in the light of the above described situation, and its objective is to provide an ultrasonic flow meter which can measure the flow rate of a flowing liquid accurately, by suppressing oscilations of the conduit for measurement which are received from externally.

SUMMARY OF THE INVENTION

In order to achieve the above described objective, the present invention proposes an ultrasonic flow meter, comprising a conduit for measurement in which a liquid flows therein, and a pair of measurement sections which are provided in said conduit for measurement and are spaced apart by a certain interval along its longitudinal direction, and which obtains the flow velocity of said flowing liquid from the difference in the propagation time periods of ultrasonic in the two opposite directions between these measurement sections, and thereby measures the flow rate thereof; wherein a pair of fixing portions are provided which respectively support said conduit for measurement at the exterior side and also at the interior side in the longitudinal direction of said measurement sections.

According to the present invention as described above, by providing the pair of fixing portions which respectively support the conduit for measurement at the outside side and the internal side of the longitudinal direction of the measurement sections, it is possible to prevent the mixture of the noise of oscilations of the conduit for measurement due to the influence of external forces from externally into the oscilations which are generated from the measurement sections for measuring the flow rate of the flowing liquid. As a result, it is possible to prevent these oscilations from becoming mutually superimposed, and therefore, it becomes possible to perform measurement of the flow rate of the flowing liquid accurately and reliably with this ultrasonic flow meter by reducing the noise of oscilations of the conduit for measurement. In particular, even if the conduit for measurement is made from a resin material, in other words even if the conduit for measurement is not extremely rigid, it is possible to avoid such mutual overlapping of these oscilations.

Furthermore, in order to achieve the above described objective, the present invention also proposes an ultrasonic flow meter, comprising a conduit for measurement in which a liquid flows therein, and a pair of measurement sections which are provided in said conduit for measurement and are spaced apart by a certain interval along its longitudinal direction, and which obtains the flow velocity of said flowing liquid from the difference in the propagation time periods of ultrasonic in the two opposite directions between these measurement sections, and thereby measures the flow rate thereof, wherein said conduit for measurement is provided with a cutaway portion upon its outer peripheral surface.

According to the present invention as described above, by providing the cutaway portion upon the outer peripheral surface of the conduit for measurement, it becomes possible to reduce the noise of oscilations which are transmitted from externally to the conduit for measurement. In particular, since it is possible easily to provide such a cutaway portion upon the exterior peripheral surface of the conduit for measurement even if the conduit for measurement is relatively thick. Accordingly, in this case, it becomes easy to reduce the noise of oscilations which are transmitted to the conduit for measurement from the outside, and therefore, it becomes possible to perform measurement of the flow rate of the flowing liquid accurately and reliably with this ultrasonic flow meter.

DETAILED DESCRIPTION OF THE INVENTION

In the following, a preferred embodiment of the ultrasonic flow meter of the present invention will be explained with reference to the drawings.

Figure 1:
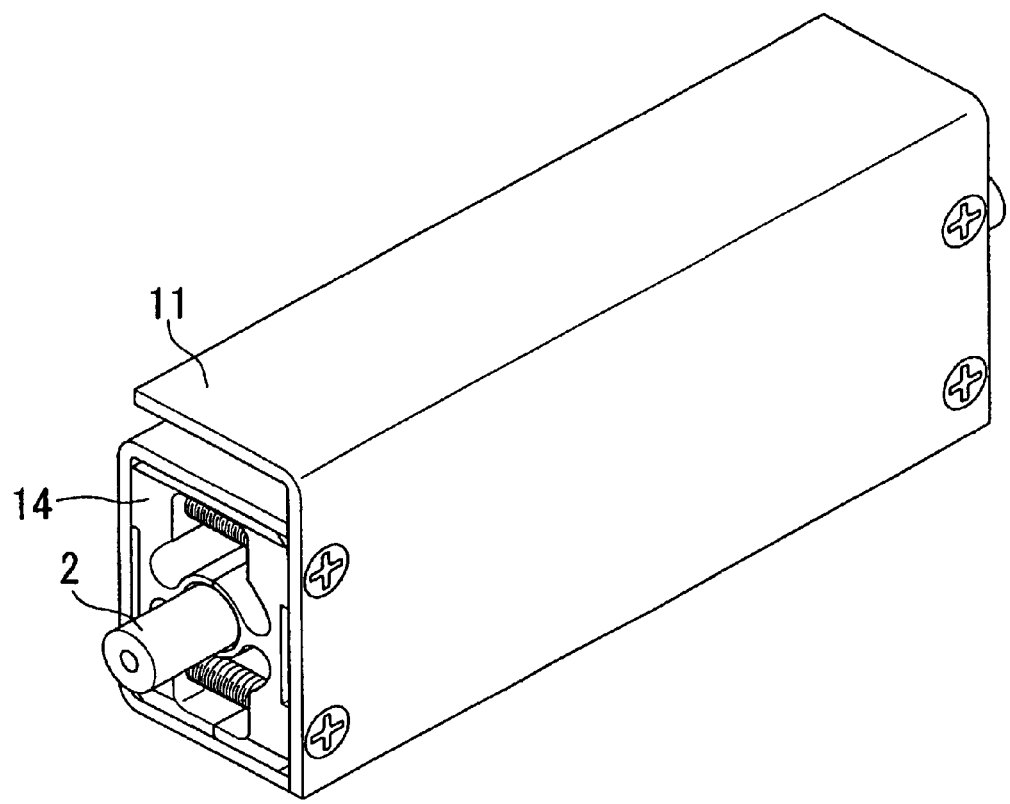
FIG. 1 is a perspective view of a preferred embodiment of the ultrasonic flow meter of the present invention, for explanation of the structure thereof.
Figure 2:
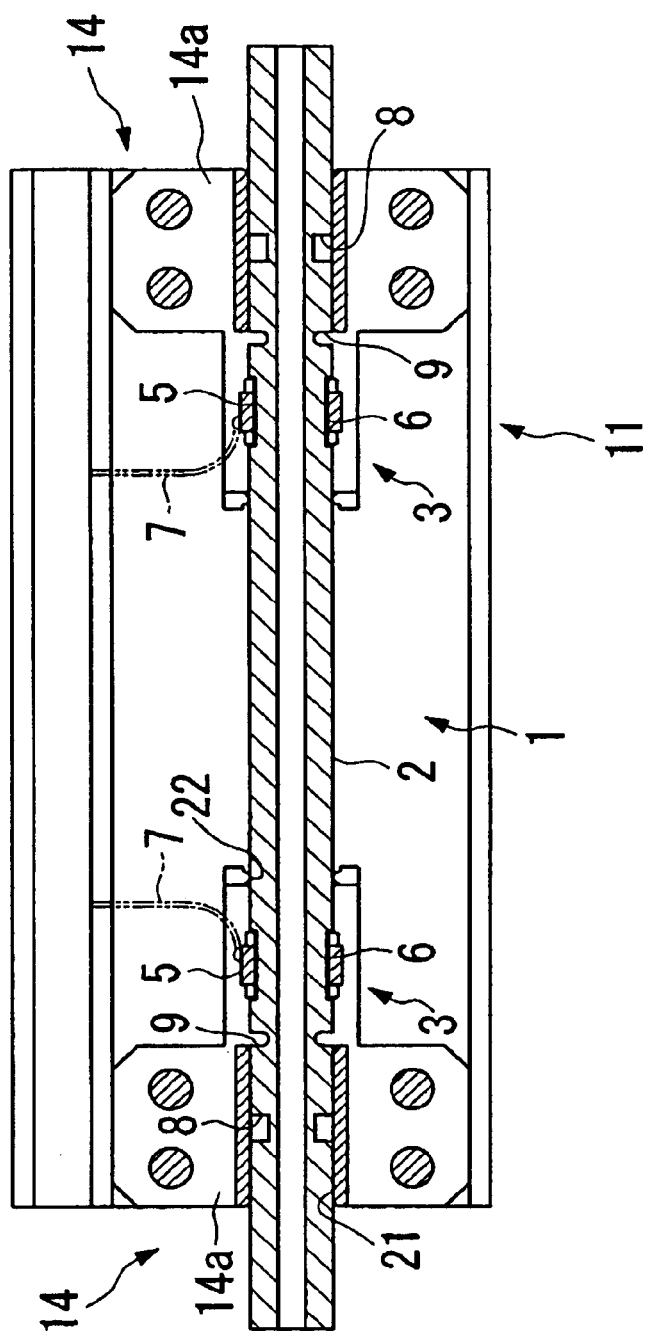
FIG. 2 is a sectional view of this preferred embodiment of the ultrasonic flow meter of the present invention, again for explanation of the structure thereof.

In FIGS. 1 and 2, the reference symbol 1 denotes an ultrasonic flow meter as a whole. This ultrasonic flow meter 1 is composed of a conduit for measurement 2 in which a liquid flows therein and made from a synthetic resin which has excellent chemical resistance such as a polyvinyl chloride or fluororesin or the like, and a pair of measurement sections 3 which are provided in this conduit for measurement and are spaced apart along a longitudinal direction of the conduit for measurement by a certain interval, for example.

Each of the measurement sections 3 is made by closely fitting a transducer 5 upon the outer circumferential surface of the conduit for measurement 2. Furthermore, the reference symbols 7 in the figure denote lead wires for these transducers 5. In addition, cutaway portions 8 and 9 are provided upon the outer circumferential surface of the conduit for measurement 2, in positions contacting within interior hole portions 21 of fixing portions 14 which will be described hereinafter, and between the measurement sections 3 and these fixing portions 14, respectively.

The ultrasonic flow meter 1 made in the above described manner is housed within a casing 11.

In this casing 11, there are provided a pair of fixing portions 14 which correspond to the pair of measurements sections 3, and these fixing portions 14 respectively support the conduit for measurement 2 at the exterior side and also at the interior side in the longitudinal direction of the measurement sections 3.

Figure 3:
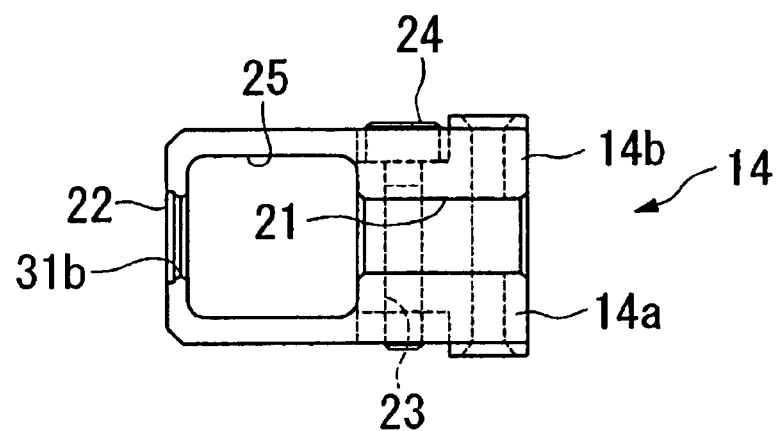
FIG. 3 is a sectional view of a fixing portion of this preferred embodiment of the ultrasonic flow meter of the present invention, for explanation of the structure thereof.

As shown in FIG. 3, each of the fixing portions 14 is made up from a first fixing member 14a and a second fixing member 14b, and a hole portion 21 is formed through the middle portion of this fixing portion 14, so that, the end portion (exterior) in the longitudinal direction of the measurement section 3 of the conduit for measurement 2 is supported by the fixing portion 14. In addtion, a hole portion 22 is formed in the inner portion (interior) of this fixing portion 14, so that, the inner portion in the longitudinal direction of the measurement section 3 of the conduit for measurement 2 is supported by the fixing portion 14.

Figure 4:
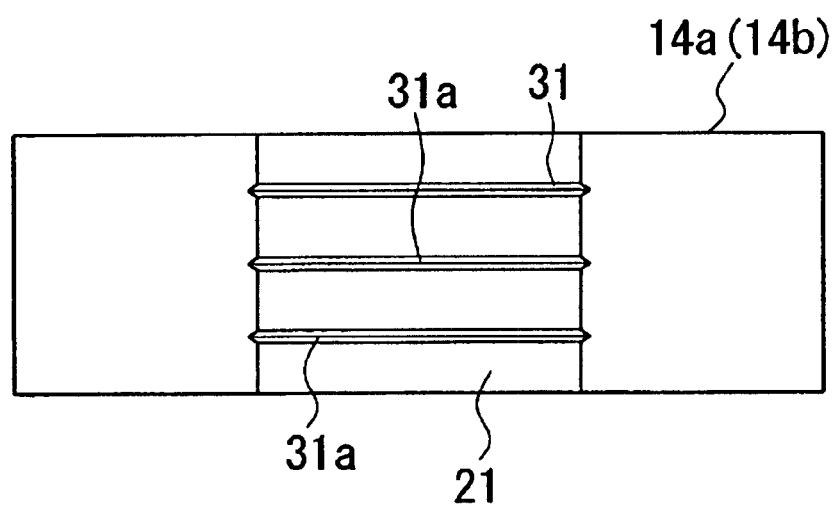
FIG. 4 is a plan view of this fixing portion of this preferred embodiment of the ultrasonic flow meter of the present invention, again for explanation of the structure thereof.
Figure 5:
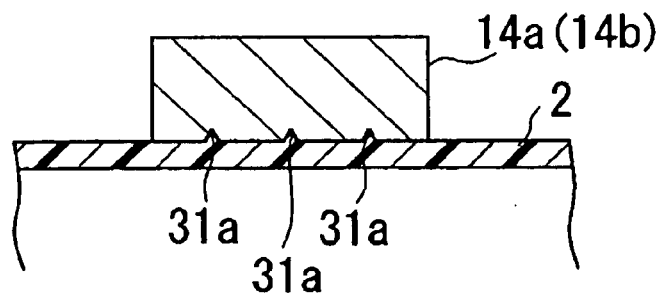
FIG. 5 is a partial sectional view of one portion of a fixing portion of a conduit for measurement in which an ultrasonic flow meter according to a preferred embodiment of the present invention is fixed, for explanation of the construction of this fixing portion.

Here, the hole portions 21 which are formed in the fixing portions 14, are made so that their internal diameter is set to be a little bit smaller than the external diameter of the conduit for measurement 2. Furthermore, as shown in FIGS. 4 and 5, in each of the hole portions 21 of the fixing portions 14, there are formed a plurality of engagement grooves 31a having "V" shaped cross section around the circumferential direction of the hole portion 21, with a certain gap in the axial direction of the hole portions 21.

Furthermore, as shown in FIG. 3, a plurality of engagement grooves 31b having "V" shaped cross section are formed in each of the hole portions 22 of the fixing portions 14 around their circumferential direction of the hole portion 22. In this case as well, the internal diameter of these engagement grooves 31b is also set to be a little bit smaller than the external diameter of the conduit for measurement 2.

In addition, a threaded hole 23 is formed in each of the fixing portions 14, and the first fixing member 14a and the second fixing member 14b are fixed together by inserting a screw 24 into this threaded hole 23, thus constituting the fixing portions 14.

Yet further, in each of the fixing portions 14, a porous portion 25 is provided between the hole portion 21 which supports the conduit for measurement 2 at the end portion in the longitudinal direction of the measurement section 3, and the hole portion 22 which supports the conduit for measurement 2 at the inner portion in the longitudinal direction of the measurement section 3.

When measuring the flow rate of a liquid which is flowing in the conduit for measurement 2 by using this ultrasonic flow meter 1, an ultrasonic pulse is emitted from one of the transducers 3 and is received by the other transducer 5, and also an ultrasonic pulse is emitted from said other of the transducers 3 and is received by said one transducer 5, and the flow velocity of the flowing liquid within the conduit for measurement 2 is obtained from the difference of propagation times of these ultrasonic pulses, so that thereby the flow rate may be measured from this flow velocity.

In this case, the fixing portions 14 which are provided in each of the pair of measurement sections 3 support the conduit for measurement 2 at the end portions in the longitudinal direction of the measurement sections 3 by the hole portions 21 which are provided at the central portions of each of these fixing portions 14, and also they support the conduit for measurement 2 at the inner portions in the longitudinal direction of the measurement sections 3 by the hole portions 22 which are provided at the end portions of each of these fixing portions 14. Therefore, since both ends of the measurement sections 3 are strongly fixed, it is possible reliably to reduce the noise of oscilations which are caused by exterior forces, such as for example the flow of the flowing liquid or the like. In particular, when the conduit for measurement 2 is made from a synthetic resin, the strength of this conduit for measurement 2 itself is low, and, although thereby it becomes easy for the influence of oscilations due to an external force to be experienced, it is possible easily to reduce the noise due to these oscilations by utilizing this type of fixing portion 14 as described above.

Accordingly, since both ends of the measurement sections 3 are strongly fixed by the conduit for measurement 2 being supported by the hole portions 21 and 22, thereby, when oscilations are generated from the transducer 5 of one of the measurement sections 3 which is provided in the hole portions 21, 22 of the conduit for measurement 2, thereby the conduit for measurement 2 comes to oscilate only due to the oscilations which are generated from this transducer 5.

As a result, it is possible to avoid the oscilations which are generated from the measurement sections 3 for measuring the flow rate of the flowing liquid, and noise of oscilations of the conduit for measurement 2 which is experienced due to external forces, becoming mixed and these oscilations becoming superimposed over one another. As a result, it becomes possible to perform measurement of the flow rate of the flowing liquid accurately with this ultrasonic flow rate measuring device 1 according to the present invention.

Yet further, by these fixing portions 14 being made integrally and incorporating the hole portions 21 and the hole portions 22, thereby both ends of the measurement section 3 are strongly fixed, and, since it becomes easy to hold the conduit for measurement 2 stably and reliably in place against oscilations, thereby it becomes possible for the oscilations which are generated by the transducers 5 themselves to be properly transmitted.

Furthermore, the noise of oscilations which are transmitted to the conduit for measurement 2 from the outside comes to be reduced, due to the conduit for measurement 2 being provided with the cutaway portions 8 and 9 around its outer peripheral surface. In particular, it becomes easy to reduce the noise of oscilations which are transmitted from the outside to the conduit for measurement 2 when the conduit for measurement 2 is thick, since then it is possible easily to provide the cutaway portions 8 and 9 upon its outer peripheral surface.

Figure 6:
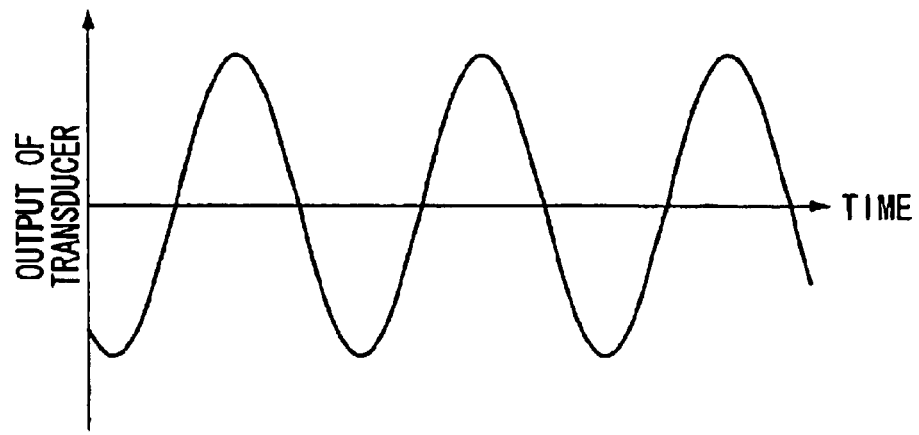
FIG. 6 is a figure showing the oscilations of a conduit for measurement of an ultrasonic flow meter of a preferred embodiment of the present invention in which no cutaway portion is provided therewith.
Figure 7:
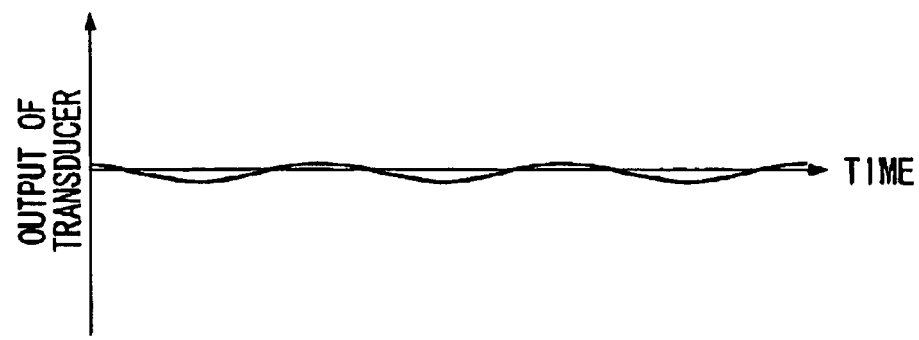
FIG. 7 is a figure showing the oscilations of a conduit for measurement of an ultrasonic flow meter of a preferred embodiment of the present invention in which a cutaway portion is provided therewith.

Here, an experiment was performed in order to compare the oscilations of a conduit for measurement 2 in which such cutaway portions were provided, and the oscilations of a conduit for measurement 2 which was not provided with any such cutaway portions. FIG. 6 is a figure showing the oscilations of a conduit for measurement 2 in which no such cutaway portions were provided. Furthermore, FIG. 7 is a figure showing the oscilations of a conduit for measurement 2 in which such cutaway portions were provided.

Referring to FIG. 6, when the conduit for measurement 2 has no cutaway portions, the result is obtained that, due to noise of oscilations of the conduit for measurement 2 being transmitted from the outside, the conduit for measurement 2 oscilates at a relatively great amplitude. On the other hand, referring to FIG. 7, when the conduit for measurement 2 does indeed have cutaway portions, the result is obtained that, due to noise of oscilations transmitted from the outside to the conduit for measurement 2 being reduced by the cutaway portions, the conduit for measurement 2 oscilates at a relatively small amplitude.

According to the above described structure, by the fixing portions 14, which are provided as a pair, respectively supporting the conduit for measurement 2 at the exterior and at the interior of the longitudinal direction of the measurement sections 3, mixing together of the oscilations which are generated from the measurement sections 3 for measuring the flow rate of the liquid which is flowing, and noise of oscilations of the conduit for measurement 2 due to external forces being experienced from the outside, and superimposition of their oscilations, are reliably prevented, and accordingly, since it becomes possible to perform measurement of the flow rate of the flowing liquid accurately by this ultrasonic flow meter according to the present invention, it is possible to measure the flow rate of the flowing liquid accurately and reliably while minimizing noise of oscilation of the conduit for measurement 2 which is experienced due to external forces.

Furthermore, by providing the conduit for measurement 2 with the cutaway portions 8 and 9 upon its outer circumferential surface, the noise of oscilations which is transmitted to the conduit for measurement 2 from externally is reduced, and, in particular, when the conduit for measurement 2 is thick, since it is easy to reduce the noise of oscilation which is transmitted to the conduit for measurement 2 from externally by the provision of these cutaway portions 8 and 9 upon its external circumferential surface which is easy, therefore it is possible to measure the flow rate of the flowing liquid accurately while reducing the noise of the oscilations of the conduit for measurement 2 which is transmitted from the outside.

Figure 8:
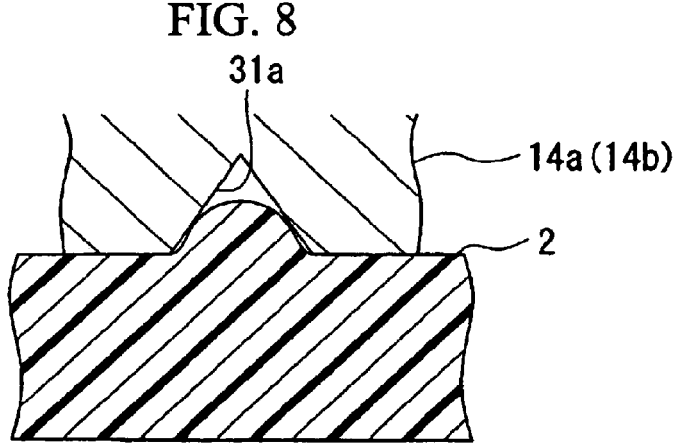
FIG. 8 is a magnified cross sectional figure showing one portion of a fixing portion of a conduit for measurement in which an ultrasonic flow meter according to a preferred embodiment of the present invention is fixed, for explanation of the construction of this fixing portion.

Furthermore, when the conduit for measurement 2 of this ultrasonic flow meter is fixed by the above described fixing portions 14, as shown in FIG. 8, the conduit for measurement 2 is securely held due to the outer peripheral portion of the conduit for measurement 21 being gripped in the engagement grooves 31a of the hole portions 21 of the fixing portions 14, and displacement in the axial direction of the conduit for measurement, and in the left and right and upwards and downwards directions as well, is reliably prevented. Due to this, it becomes easy to reduce the noise of oscilations from the outside which is transmitted to the conduit for measurement 2. Thus it becomes possible to measure the flow rate of the liquid which is flowing reliably and accurately while reducing the noise of the oscilation which is received by the conduit for measurement 2 from externally.

Furthermore, by providing the porous portions 25 in the fixing portions 14 between the hole portions 21 and the hole portions 22, it becomes possible to reduce the weight of the fixing portions 14, so that further it becomes possible to reduce the weight of the ultrasonic flow meter 1. Moreover since, by providing the porous portions 25, the surface of the conduit for measurement 2 contacts the external atmosphere, and thereby the temperature of the conduit for measurement 2 is brought to be close to the ambient temperature, thereby, along with the temperature of the liquid which is flowing in the conduit for measurement 2 being brought close to the ambient temperature, also it becomes possible to bring the temperature of the transducers 5 which are provided upon the exterior surface of the conduit for measurement 2, and which are now in contact with the external atmosphere, close to the ambient temperature. Therefore it becomes possible to suppress measurement errors due to differences of temperature to the minimum limit. Yet further, since the heat capacity of the fixing portions 14 is reduced by the provision of these porous portions 25, thereby the rise of temperature due to heat which is transmitted from the fixing portions 14 to the conduit for measurement 2 or to the transducers 5 is small.

It should be understood that the cutaway portions 8 and 9 which are provided upon the outer peripheral surface of the conduit for measurement 2 are not limited to being in the shown positions in which they contact between the measurement sections 3 and the fixing portions 14, and within the hole portions 21 of the fixing portions 14; they could be positioned in any of various other positional arrangements, provided that they were in positions which provided the beneficial effect of enabling reduction of the noise of external oscilations.

What is claimed is:

1. An ultrasonic flow meter, comprising a conduit for measurement in which a liquid flows therein, and a pair of measurement sections which are provided in said conduit for measurement and are spaced apart by a certain interval along its longitudinal direction, and which obtains the flow velocity of said flowing liquid from the difference in the propagation time periods of ultrasonic in the two opposite directions between these measurement sections, and thereby measures the flow rate thereof; wherein a pair of fixing portions are provided which respectively support said conduit for measurement at the exterior side and also at the interior side in the longitudinal direction of said measurement sections.

2. An ultrasonic flow meter according to claim 1, wherein said conduit for measurement is provided with a cutaway portion upon its outer peripheral surface.

3. An ultrasonic flow meter according to claim 1, wherein each of said fixing portion has a porous portion which is provided between the two hole portions which support said conduit for measurement at the exterior side and also at the interior side in the longitudinal direction of said measurement sections.

4. An ultrasonic flow meter according to claim 2, wherein each of said fixing portion has a porous portion which is provided between the two hole portions which support said conduit for measurement at the exterior side and also at the interior side in the longitudinal direction of said measurement sections.

5. An ultrasonic flow meter according to claim 1, wherein each of said fixing portions has a plurality of engagement grooves having "V" shaped cross section around the circumferential direction of said conduit for measurement with a certain gap in the longitudinal direction of said measurement sections, on a surface which faces to said conduit for measurement.

6. An ultrasonic flow meter according to claim 2, wherein each of said fixing portions has a plurality of engagement grooves having "V" shaped cross section around the circumferential direction of said conduit for measurement with a certain gap in the longitudinal direction of said measurement sections, on a surface which faces to said conduit for measurement.

7. An ultrasonic flow meter according to claim 3, wherein each of said hole portions has a plurality of engagement grooves having "V" shaped cross section around the circumferential direction of said conduit for measurement with a certain gap in the longitudinal direction of said measurement sections, on a surface which faces to said conduit for measurement.

8. An ultrasonic flow meter according to claim 4, wherein each of said hole portions has a plurality of engagement grooves having "V" shaped cross section around the circumferential direction of said conduit for measurement with a certain gap in the longitudinal direction of said measurement sections, on a surface which faces to said conduit for measurement.

9. An ultrasonic flow meter according to claim 1, wherein the conduit for measurement is made from a synthetic resin.

10. An ultrasonic flow meter according to claim 2, wherein the conduit for measurement is made from a synthetic resin.

11. An ultrasonic flow meter according to claim 3, wherein the conduit for measurement is made from a synthetic resin.

12. An ultrasonic flow meter according to claim 4, wherein the conduit for measurement is made from a synthetic resin.

13. An ultrasonic flow meter according to claim 5, wherein the conduit for measurement is made from a synthetic resin.

14. An ultrasonic flow meter according to claim 6, wherein the conduit for measurement is made from a synthetic resin.

15. An ultrasonic flow meter according to claim 7, wherein the conduit for measurement is made from a synthetic resin.

16. An ultrasonic flow meter according to claim 8, wherein the conduit for measurement is made from a synthetic resin.

* * * * *